United States Patent [19]

Xuan et al.

[11] 4,456,866

[45] Jun. 26, 1984

[54] METHOD FOR SLAVING A STEPPING MOTOR AND ARRANGEMENT FOR PRACTISING THE METHOD

[75] Inventors: Mai Tu Xuan, Chavannes; Michel Grosjean, Bienne, both of Switzerland

[73] Assignee: Omega S.A., Bienne, Switzerland

[21] Appl. No.: 361,997

[22] Filed: Mar. 25, 1982

[30] Foreign Application Priority Data

Mar. 31, 1981 [CH] Switzerland ......................... 2165/81

[51] Int. Cl.³ ............................................ H02K 29/04

[52] U.S. Cl. .................................... 318/696; 318/685; 368/157

[58] Field of Search ................. 368/157, 76, 159, 200; 318/696, 685

[56] References Cited

U.S. PATENT DOCUMENTS

| | | | |
|---|---|---|---|
| 4,158,287 | 6/1979 | Nakajima et al. | 58/23 BA |
| 4,271,496 | 6/1981 | Shida et al. | 368/80 |
| 4,300,223 | 11/1981 | Marin et al. | 368/85 |
| 4,326,278 | 4/1982 | Shida et al. | 368/157 |

FOREIGN PATENT DOCUMENTS

| | | |
|---|---|---|
| 0022270 | 1/1981 | European Pat. Off. |
| 2854084 | 6/1979 | Fed. Rep. of Germany . |
| 2388326 | 11/1978 | France . |
| 2410843 | 6/1979 | France . |

OTHER PUBLICATIONS

10th International Congress of Chromometry, Adaptive Controlled Drive System of Stepping Motor for Analog Quartz Watch by Makoto Veda et al., pp. 67-121; Sep. 14, 1979.

*Primary Examiner*—G. Z. Rubinson
*Assistant Examiner*—Saul M. Bergmann
*Attorney, Agent, or Firm*—Griffin, Branigan & Butler

[57] ABSTRACT

A method for slaving a stepping motor proposes several levels of width of the control pulses U in order to adapt the torque provided by the motor to the load imposed thereon. The method includes measurement of the induced voltage Ui during a time interval $T_{Ui}$ situated immediately before the end of the control pulse U if the duration of such pulse does not exceed a predetermined duration $T_n$ (FIG. 8) or within a gap $T_x$ opened in the control pulse U if such pulse does exceed said predetermined duration $T_n$ (FIG. 11).

The method may be applied to slaving stepping motors wherein the stator exhibits air gaps or saturable zones.

9 Claims, 12 Drawing Figures

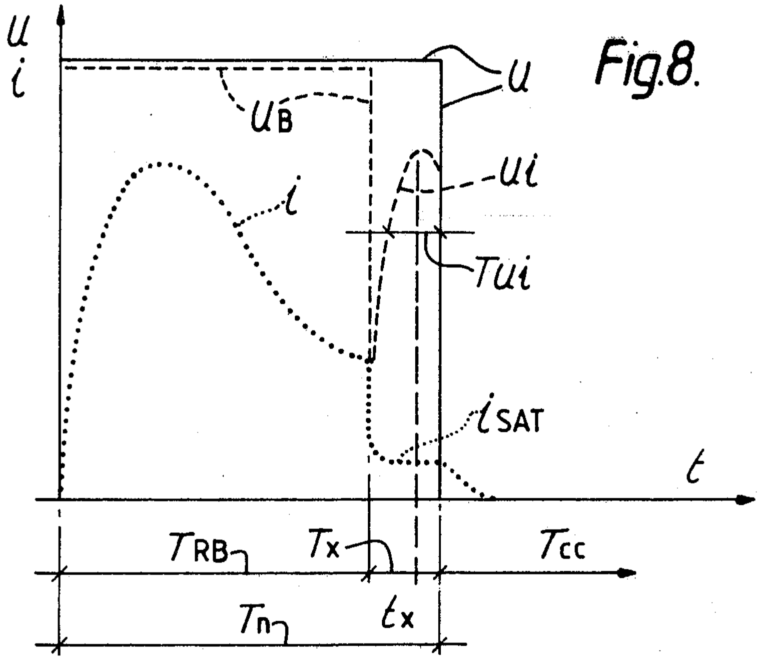
Fig.8.
Fig.9.
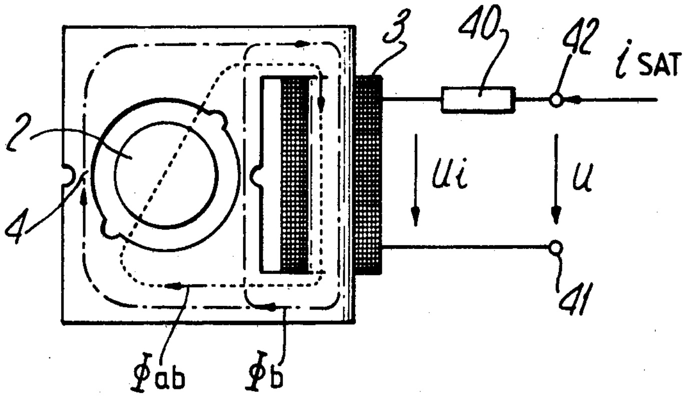

METHOD FOR SLAVING A STEPPING MOTOR AND ARRANGEMENT FOR PRACTISING THE METHOD

BACKGROUND OF THE INVENTION

This invention concerns a method for slaving a single-phase stepping motor driven by a bipolar pulse train to the load imposed by the mechanism of a timepiece. It proposes various improvements to a slaving system as described in the patent application EP 0 022 270.

The cited application sets forth a driving arrangement which permits the detection of the rotor position of a stepping motor relative to the polarity of the driving pulses and applying to the motor a pulse train of long duration if this polarity should be considered incorrect. In other words, if the rotor does not step following the application of a correct polarity motor pulse, it will receive following a predetermined time interval (one second for instance) a new pulse of the wrong polarity and it is from this moment on that the system comes into effect, the correction or recovery operating by applying to the motor two closely-spaced pulses of long duration followed by a train of pulses of greater width. None of the documents cited as prior art in the application in question describe such an arrangement.

It has however been noted that the detector as previously described presents several disadvantages which will be hereinafter set forth.

Initially, the system previously proposed in the cited application foresees two types only of pulses: narrow pulses when the torque exerted on the motor is small and wide pulses when this torque has increased beyond a certain limit. In practice, it has however been determined that such torque may take very diverse values owing for instance to one or more of the following load demands or a combination thereof: changing over of the calendar, friction in the bearings and wear thereof, ageing of the lubricants, lowering of temperature, external magnetic fields, linear or angular shocks, manufacturing tolerances, etc. In the cited application, with a choice limited to two pulse widths only, it will be necessary either to choose a first type of pulses of very short duration in order to respond to even the most minor of the foregoing load demands, or to choose a first type of pulses having a greater duration in order only to activate slaving occasionally when an important increase in torque occurs such as for a change over of the calendar. Whatever may be the chosen solution, it will be understood that the previously proposed system, although consuming less energy than a system without slaving, is not capable of reacting in a precise manner, that is to say adapting the current consumption to the real load which may be imposed on the motor.

Further, if the system of the cited application is well adapted to a stepping motor of which the poles of the stator are separated by an air gap, it is much less so adapted to a motor having saturable zones of which the poles are connected by necks of small width. FIG. 1 of the present description shows schematically a motor of which the stator poles are separated by air gaps 1. In such case, all the flux $\Phi_{ab}$ coming from the rotor magnet 2 passes through the core of the winding 3 in order to produce at the terminals of this winding an induced voltage Ui whenever the rotor is in motion. In the application EP 0 022 270, it has been proposed to measure the induced voltage Ui immediately following the end of a motor pulse, the winding being open-circuited. If the motor with gaps receives a correct polarity pulse, the voltage Ui measured at the terminals of its winding will be of an amplitude sufficiently high to decide whether it is possible to continue to drive the motor with small width pulses. It is however otherwise if one applies the system described in the cited application to a motor having saturable zones. FIG. 2 shows schematically such a motor where the stator poles are connected by necks 4. In this case it is to be seen that the flux created by the magnet is divided into a flux $\Phi_f$ passing through the necks and a flux $\Phi_{ab}$ passing through the winding core. It results from this that if one applies the system of the cited application (that is to say one measures the voltage Ui at the terminals of a winding in an open circuit) to a saturable zone type motor, one will receive an induced voltage of very small amplitude, this being unfavourable to proper operation of the control electronics.

Finally, since the cited application foresees detection of the induced voltage only after single pulses of small width where one may detect voltage of sufficient amplitude, it is not evident how to proceed in order to detect a sufficient voltage following a pulse of longer duration since as will appear from the following, the induced voltage diminishes rapidly when the control pulse is prolonged.

It is the purpose of this invention to overcome the aforementioned difficulties by proposing a method and an arrangement such as are defined in the claims hereinafter.

BRIEF DESCRIPTION OF THE DRAWINGS

FIG. 8 is a graphical representation showing the various voltages which may be found at the terminals of the motor winding as well as the current passing therethrough.

FIG. 9 is a schematic representation of a motor of which the stator poles are separated by necks and to which is applied the arrangement according to the invention.

DETAILED DESCRIPTION OF THE INVENTION

Figure 3:
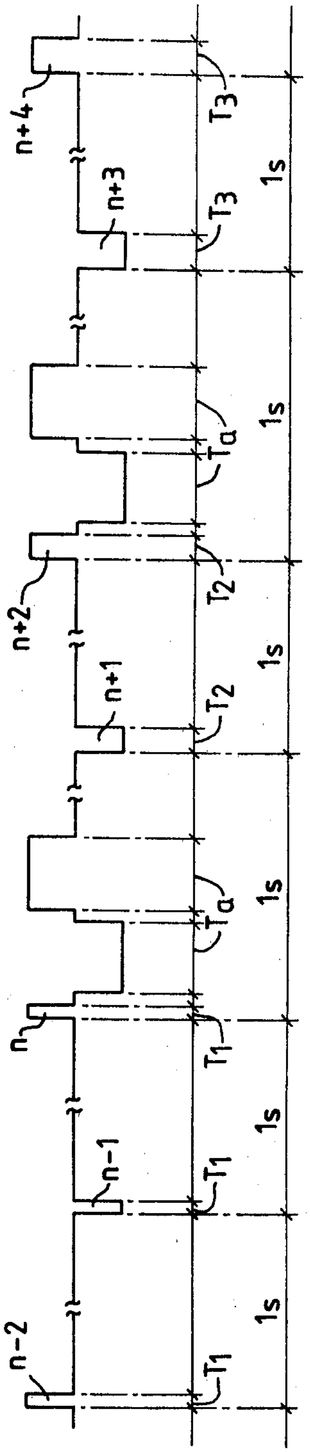
FIG. 3 is a diagram representing the various pulses applied to the motor according to a first variant of the invention.

Reference will be made initially to the diagram of FIG. 3 in order to understand how one proceeds to slave a stepping motor according to a first variant of the invention. Pulses referenced n−2 to n+4 are control pulses as received at the motor winding. The beginning of each of them is separated by a constant time interval, e.g. one second, thereby causing the seconds hand of the watch to step through one second. A clock signal comes from an output of a chain of frequency dividers itself driven by an oscillator forming a time base according to well-known arrangements.

Under optimum operating conditions, i.e. when the load demands mentioned hereinabove are not present, the motor will operate almost under a no-load condition and a pulse of very small width $T_1$ such as shown at n−2 on the diagram is sufficient to cause normal advance of the seconds hand. It will now be supposed that after the pulse n−2 to which the motor has again responded, the mechanical load torque suddenly increases owing to a combination of several load demands. The rotor will thus no longer react to the pulse n−1 and when the following pulse n arrives, it will again no longer react since in order to cause it to advance it would be necessary that it receive at this time a negative polarity pulse. Thus, the rotor will have lost two steps, which must be recovered. According to the idea already expressed in the application EP 0 022 270, in order to recover this loss there will be applied to the motor two recovery pulses of great width $T_a$ a short interval of time following the end of pulse n. As may be seen on FIG. 3, the first recovery pulse is shown in the same sense as pulse n−1 and the second in the opposite sense in a manner such that the pulses of great width $T_a$ are substituted for the control pulses n−1 and n of width $T_1$ which have been incapable of causing the rotor to advance. The duration $T_a$ is of course chosen to be sufficiently long to definitely advance the rotor under the most unfavourable load conditions. The graph of FIG. 3 nevertheless exaggerates this duration $T_a$ relative to the duration $T_1$ with the purpose of bringing out more clearly the operation of the system. The invention presents the novelty relative to the invention claimed in the cited application of not following up with a pulse train of fixed greater width immediately after the recovery pulses but of elongating somewhat the control pulse of duration $T_1$ into a duration $T_2$ and testing whether or not this new pulse may be of sufficient duration in order to cause the rotor to advance. If such is not the case, following the new pulses n+1 and n+2 of duration $T_2$ there are applied two new recovery pulses of duration $T_a$ as shown in FIG. 3. In turn the recovery pulses are followed by new control pulses n+3, n+4 of duration $T_3$ slightly greater than the duration $T_2$. If the latter are capable of stepping the motor, they will be followed with pulses of duration $T_3$. If not, still further recovery pulses are applied in order to proceed thus with pulses of width $T_4$ where $T_3<T_4$ and thus continuing.

Figure 12:
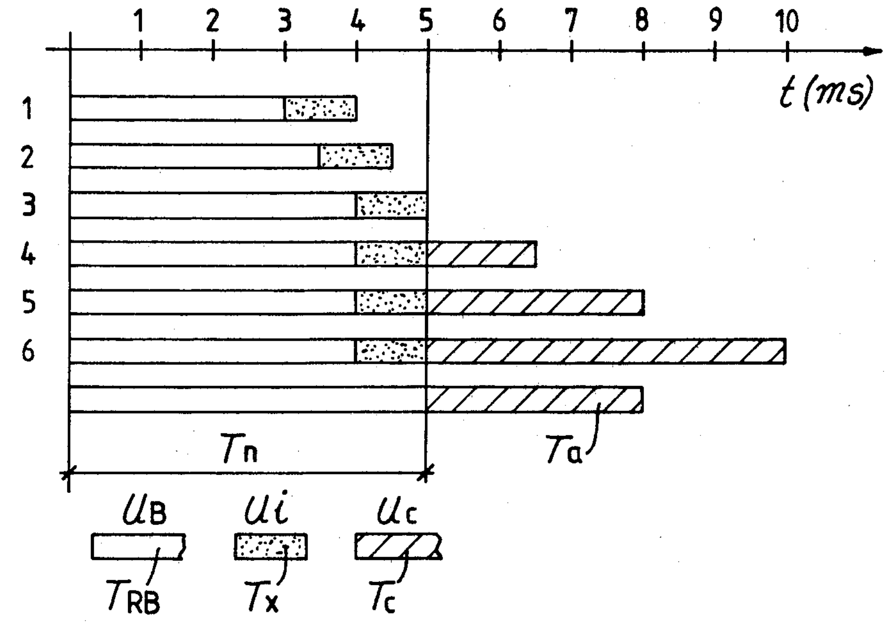
FIG. 12 is a diagram illustrating the various durations of pulse which may apply for driving the motor according to the invention.

Thus, the method which has just been described shows that the width of the control pulses is adapted to the load imposed on the motor by successive levels which increase when the load increases. The method thus permits the economizing of energy and this to a more important degree than in the case where one has at disposal only two types of pulses as foreseen in the cited application. In one particular realization, six different pulses have been chosen for which the driving width extends from 3 to 9 ms by successive levels increasing by 0.5 ms for the first three, by 1.5 ms for the fourth and fifth and by 2 ms for the sixth. In this same realization the recovery pulse width has been chosen to be 8 ms. Such will appear in greater detail when the diagram as represented in FIG. 12 has been explained.

It will now be supposed that for pulses n+3, n+4, etc., of duration $T_3$ the motor advances normally and no failure to step is detected. It may be considered that at the end of a predetermined period the load demands which brought about a changing of the duration of pulses from $T_1$ to $T_3$ have ceased. One may then cause the duration of the control pulses to decrease from $T_3$ to $T_2$. If the result is satisfactory during a same predetermined time period, again the level may be lowered and transformed from the duration $T_2$ to the duration $T_1$. The aforesaid predetermined period may be chosen following observations which have been carried out on the operation of the timepiece under various circumstances which may arise. It has been chosen in the particular example mentioned above at 512 seconds. In sum, the duration of the control pulses is adapted to the load imposed on the motor by successive decreasing levels when the load decreases.

Figure 4:
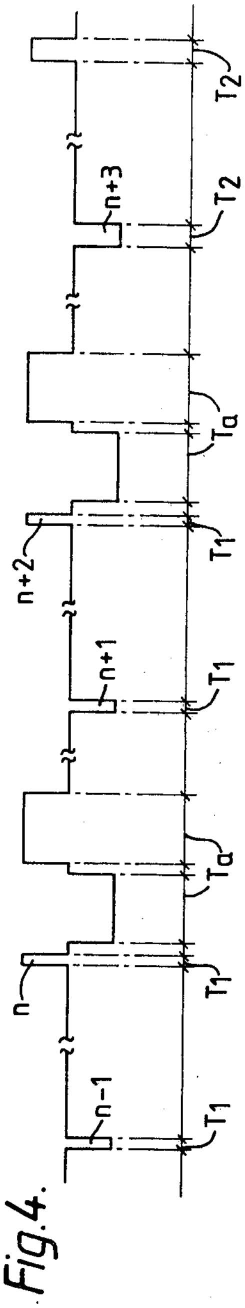
FIG. 4 is a diagram representing various impulses applied to the motor according to a second variant of the invention.

FIG. 4 shows a second variant of the method according to the invention where following the application of two recovery pulses the motor continues to be driven by a pair of pulses of the same duration as those which existed before the correction. In the figure the control pulses n+1 and n+2 have the same duration $T_1$ as that of pulses n−1 and n. It may well be that under certain circumstances the load demands have a transitory character such that they rapidly disappear. An attempt to feed the motor a second time by pulses the duration of which has not caused the rotor to advance the first time may be fruitful for, if the attempt is successful, it will be possible to avoid an increase in energy consumption owing to a useless enlargement of the control pulses. If, however, the attempt does not succeed, one may then drive the motor with pulses of longer duration after having sent two recovery pulses.

This second variant is not limited to a renewed application of a single pair of pulses of the same duration and it will be understood that means may be provided to continue to drive the motor with pulses $T_1$ as long as a predetermined number of recovery pulses have not been counted within a predetermined interval. Thus, for example, it may be decided that if the rotor has failed to step four times during 60 seconds, these failed steps having been followed by four recovery pulses, one may then drive the motor by pulses of duration $T_2$.

Since in the method as described, the arrangement is such that the control pulse duration is just sufficient to drive the mechanism, it will be realized that in certain cases nevertheless rare, the rotor after having normally started following a pulse of correct polarity, will stop after having made only a half step.

Figure 5:
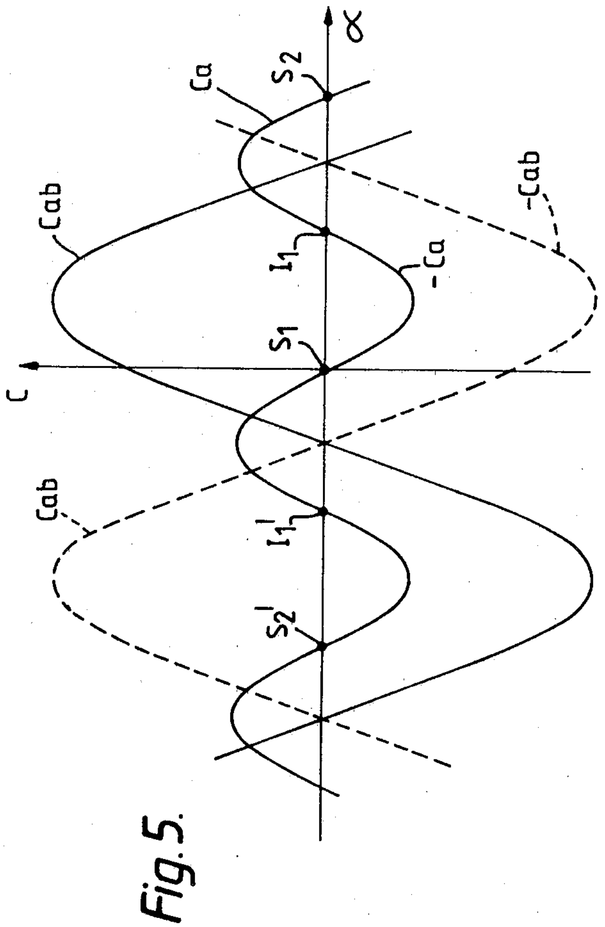
FIG. 5 is a graphical representation showing the mutual positioning torques of the motor as a function of the position $\alpha$ of its rotor.

FIG. 5 shows the evolution of the positioning torque Ca and the mutual torque Cab such as may be found in a stepping motor. Angular positions $S'_2$, S' and $S_2$ are positions of stable equilibrium of the rotor and positions $I'_1$ and $I_1$ are positions of unstable equilibrium thereof. Normally, if the rotor makes its step responsive to a positive pulse, it passes from position $S_1$ to position $S_2$. In the special case which has just been mentioned it may happen that the rotor stops in position $I_1$ which represents only a half step. Although this position is unstable, it is possible that the rotor will be stalled there by friction acting thereon. If prior to the next control pulse, any disturbance whatsoever is applied to the watch, the rotor may either spring back to position $S_1$ or advance to position $S_2$. In the first case, the next control pulse will be of incorrect polarity and the recovery pulses $T_a$ will bring about recovery of both lost steps. In the second case the rotor will itself recover the lost step and no recovery pulse will be applied thereto. The situation however is different if the rotor remains fixed on position $I_1$ when the next pulse arrives. Effectively, this next negative pulse will develop a mutual torque-Cab which is found to be in the same sense as the negative positioning torque -Ca. If the torque-Cab is very high, it is then possible that combined with the couple -Ca it will develop sufficient energy to displace the rotor from position $I_1$ to the position $S'_2$ without stopping the position $S_1$, this displacement operating without causing detection of an incorrect polarity. The rotor then will be fixed in a stable position $S'_2$. From this moment on the next pulse directed in a positive sense will develop the mutual torque Cab shown in the dashed line and the rotor will progress normally. It may be concluded from the foregoing that the rotor has definitely lost two steps which it will not be possible to recover.

Figure 6:
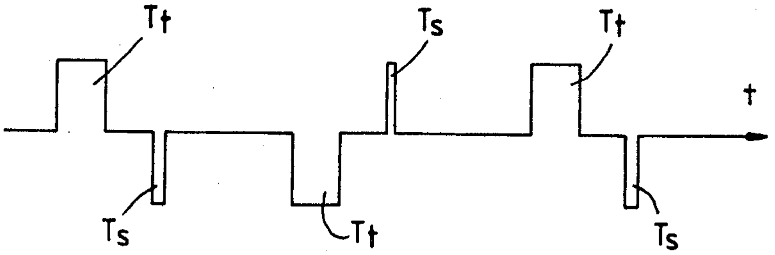
FIG. 6 is a diagram showing how the motor is driven by security pulses in accordance with the invention.

FIG. 6 shows an arrangement overcoming the difficulty just cited and proposes that in accordance with the invention to apply to the motor winding a security pulse of duration $T_s$ at a predetermined time interval after the end of the control pulse of duration $T_t$. Referring to FIG. 5, it will be understood that if the rotor is stalled in position $I_1$, a very short duration pulse will suffice in order to arrive either at $S_1$ or at $S_2$. A negative security impulse will bring the rotor to $S_1$ and the next normal control pulse will be shown up as incorrect, thereby setting off the two recovery pulses as has been explained above. A positive security pulse will bring the rotor into $S_2$; in this case, the next control pulse will appear as correct and no recovery will take place. In practice, a negative security pulse is preferred, since it requires less energy to bring the rotor from position $I_1$ to position $S_1$ than from the position $I_1$ to the position $S_2$. In a practical example of the invention, the duration of $T_s$ will be between 0.2 and 0.5 ms and the duration of the time lapse separating the end of the control pulse from the security pulse will be on the order of 50 ms.

It has just been shown how the various control pulses are arranged relative to one another, how their durations may be adapted to the load imposed by the mechanism and how it is possible to recover lost steps. This naturally presupposes that means are available to detect steps which have not been made. In application EP 0 022 270, this detection is based on the polarity of the control pulse relative to the position of the rotor and if the motor is of the type having an air gap, the induced voltage at the winding terminals is measured, the winding being open-circuited. If the motor receives a pulse in the correct sense, the induced voltage as measured will be of large amplitude while such voltage will be zero or even negative if the pulse is directed in the incorrect sense. There has been set forth in the introduction the difficulty which exists for measuring this voltage with an open circuit for a motor having saturable zones since the amplitude of the voltage is relatively small.

Figure 7:
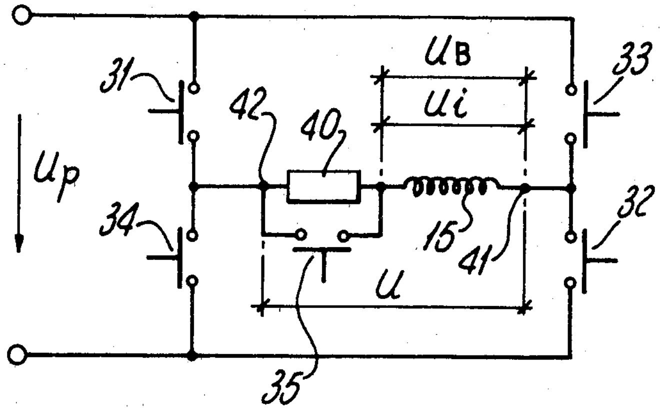
FIG. 7 shows an arrangement for practising the method in accordance with the invention.

FIG. 7 shows means for obtaining an induced voltage Ui of sufficient magnitude even if the motor is of the type having saturable zones. The schematic as shown is scarcely distinguished from the stage of the art except by the addition of a resistance 40 coupled in series with the motor winding 15, such resistance being adapted to be short-circuited whenever the switch 35 is closed. In this drawing there will be found between the terminals 41 and 42 alternating control pulses having amplitude U and coming from the direct driving source $U_p$ supplied by the battery when switches 31–32, and respectively 33–34 are closed. If the time period during which the single winding 15 is connected to terminals 41 and 42 is defined by $T_{RB}$ and the time period during which the circuit made up of winding 15 and resistance 40 is connected to the terminals by $T_x$ and the time period during which winding 15 is short-circuited by $T_{cc}$ the control sequence of the switches is established according to the table hereunder for a positive pulse:

| | Switches | | | | |
|---|---|---|---|---|---|
| Period | 31 | 32 | 33 | 34 | 35 |
| $T_{RB}$ | closed | closed | open | open | closed |
| $T_x$ | closed | closed | open | open | open |
| $T_{cc}$ | closed | open | closed | open | closed |

In current technique transistors are employed to operate as switches. They receive their signals from a well-known type of pulse forming circuit.

Reference will now be made to FIG. 8 in order to understand the role played by the additional resistance 40. In this graph there has been shown in full line the control pulse U which is to be found at terminals 41 and 42 (see FIG. 7). This control pulse is present as long as switches 31 and 32 are closed, that is to say during period $T_{RB}$ and period $T_x$ (see above table). The duration of this pulse will be designated by $T_n$. During the period $T_{RB}$ resistance 40 is short-circuited and winding 15 receives voltage $U_B$, represented in dashed lines identical to voltage U if one ignores the small voltage drop which exists at the terminals of switch 35. This voltage $U_B$ is also practically that found at the terminals of the battery ($U_p$). $U_B$ is the motor voltage necessary to drive the rotor. During period $T_x$, the resistance 40 is connected in series with winding 15 and the switch 35 is open. This is the measuring period for sampling the induced voltage Ui developed by the motor at the terminals of the winding.

FIG. 9 illustrates the behaviour of the motor during the measuring period $T_x$. Reference will be made at the same time to FIGS. 7 and 8. As has been already said, from the beginning of period $T_x$ the control voltage U is applied to terminals 41 and 42 of the circuit which includes winding 3 and resistance 40 connected in series. The value of resistance 40 will be chosen in a manner such as to generate in winding 3 a current $i_{SAT}$ which in its turn will produce a flux $\Phi_b$ sufficient to saturate the necks 4 of the stator. From the moment when these necks are saturated almost the entire flux $\Phi_{ab}$ created by the magnet passes through the core of winding 3. The flux $\Phi_{ab}$ produces at the winding terminals an induced voltage $$Ui = N_b \cdot (d\Phi_{ab})/dt$$

where $N_b$ represents the number of turns on the winding. Conditions are thus established similar to those which have been described in application EP 0 022 270 in which a substantial voltage Ui indicates the application of a correct polarity pulse to the motor. This situation is illustrated by FIG. 8 which shows that at a predetermined instant $t_x$ of the period $T_x$, the voltage Ui shown in dashed lines is of large amplitude following which the motor continues to be driven by the same control pulses of width $T_n$. Practically, one measures the induced voltage Ui in a time interval $T_{Ui}$ comprised within the period $T_x$, an interval which may cover for instance the last two thirds of the period $T_x$. FIG. 8 shows also that the current $i_{SAT}$ during the period of measurement $T_x$ is of small amplitude, although sufficient to saturate the necks. This arrangement which consists of connecting a resistance in series with the motor winding consumes thus only negligible energy since the necessary current is very small and the duration of the current is reduced to a small fraction of the total duration of the control pulse. Finally, during the time separating the end of the control pulse and the arrival of a new pulse the winding is short-circuited as is the usual custom in order to damp the rotor movement.

As will be seen further on, the method which has just been described is not suitable for control pulses of which the duration $T_n$ is relatively short. Such being the case, in summary it may be affirmed that for control pulses for which the width is equal or less than the duration $T_n$, a resistance is coupled in series with the motor winding during a period $T_x$ situated immediately before the end of the control pulse U and that during the said period $T_x$ one measures during a predetermined interval $T_{Ui}$ the voltage induced at the terminals of the motor winding.

As a practical example one may choose for the shortest period $T_{RB}$ a duration of 3 ms and for the period $T_x$ a duration of 1 ms while the value of the resistance 40 is in the order of 15 kΩ for a winding resistance of 3 kΩ.

If the process which has just been described has been specially developed for a saturable zone motor, it may also be applied to motors with gaps although this might be considered as useless since it suffices, as has been said before, to measure for this latter type of motor the voltage Ui immediately following the end of pulse $U_B$, the winding being at that point open-circuited. However, the universality of the procedure would permit utilizing the same electronic control circuit for both types of motor which would of course result in a simplification and a diminution of costs.

It has just been explained how the induced voltage Ui is measured at the motor winding by initially staturating the necks if one has to do with a saturable zone type motor. The teaching of application EP 0 022 270 is also recalled wherein this voltage is measured immediately following the motor pulse, the winding then being in open circuit. It has been explained in the cited application that the voltage Ui is equal to $$Ui = \Omega \cdot (Cab)/i$$

where Ω is the angular velocity of the rotor and Cab/i is the coupling factor. If one refers once again to FIG. 5 it will be understood that beyond a certain angular position corresponding to a limiting pulse duration the voltage Ui will be situated below a useful value since the coupling factor Cab/i diminishes. Now, since it is necessary to increase the duration of the control pulses if one wishes to increase the mechanical torque which the motor is required to furnish, occasions will arise when the duration of the control pulse will be too long for the winding to furnish a detection voltage of sufficient useful magnitude.

Figure 10:
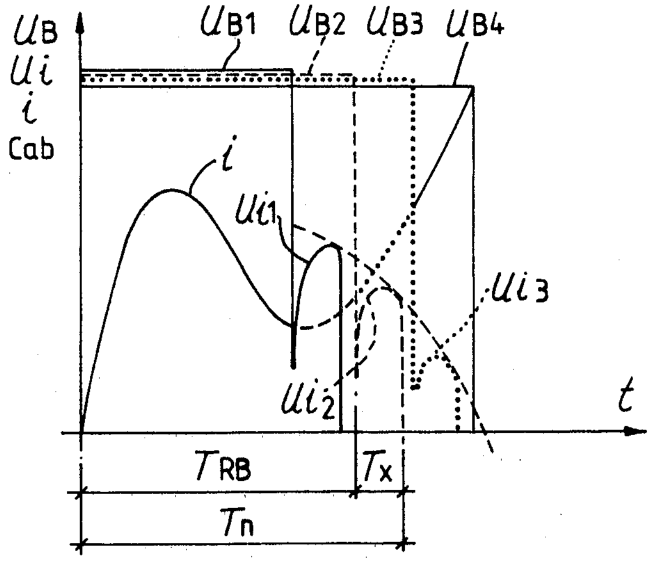
FIG. 10 is a graphical representation showing how the amplitude of the induced voltage evolves when the motor pulse is prolonged.

FIG. 10 illustrates this phenomenon and shows how the amplitude of the voltage Ui diminishes when the pulse $U_B$ is prolonged. One may note that to the motor pulses having increasing duration $U_{B1}$, $U_{B2}$ and $U_{B3}$ correspond respectively the induced voltages $Ui_1$, $Ui_2$ and $Ui_3$, the maximum of said voltages being situated on an envelope of which the form represents the coupling factor Cab/i, at that rotor speed. For pulse $U_{B4}$, the figure shows that no induced voltage is detected. If it be admitted that the induced voltage $Ui_3$ following impulse $U_{B3}$ is already incapable of effecting correct operation of the regulating circuit since it is of low amplitude, it will be necessary to find an expedient which will permit certain detection for all control pulses of which the width exceeds the limiting duration $T_n$.

Figure 2:
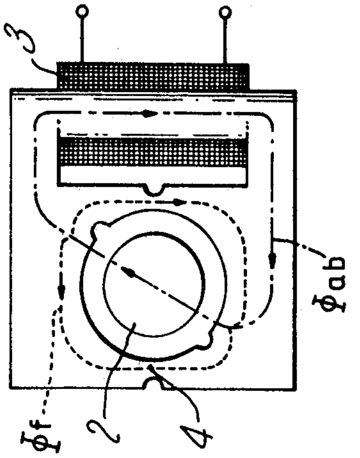
FIG. 2 is a representation of a known motor for which that stator poles are separated by necks.
Figure 11:
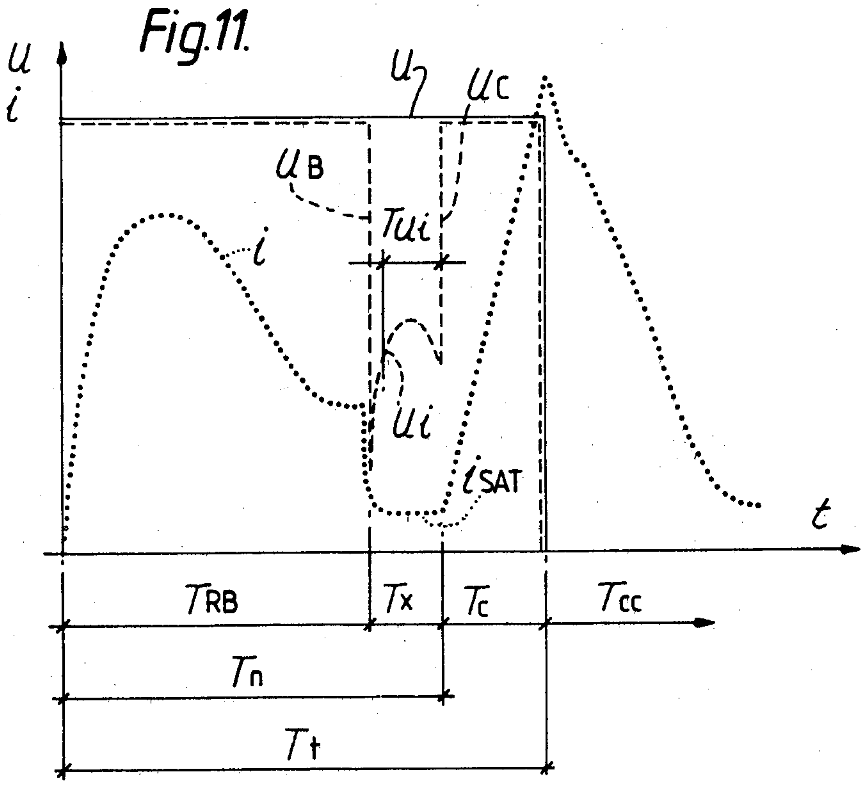
FIG. 11 is a graphical representation showing how one proceeds to measure the induced voltage when the control pulse exceeds a predetermined duration.

FIG. 11 shows how one may proceed in accordance with the invention to overcome this difficulty. In the graph as shown, the control pulse U comprises two motor pulses $U_B$ and $U_c$ separated by a period $T_x$ during which the induced voltage is measured according to the process which has been explained above. Thus, if the width $T_t$ of the control pulse is greater than the duration $T_n$ from which point on the amplitude of the induced voltage Ui would be insufficient or zero, the induced voltage Ui is measured during an interval $T_{Ui}$ included in the period $T_x$ immediately preceding the end of the period $T_n$. In other words, if the duration $T_t$ of the impulse U necessary to advance the rotor is too long for one to be able to detect an induced voltage of sufficient amplitude as has been explained above, a gap or window will be opened in the aforesaid pulse U and during this gap the induced voltage will be measured. It is of course understood that the placing of this window or gap is chosen to be in a place where the amplitude of the induced voltage is still sufficient. The gap is obtained by coupling a resistance in series with the winding during the period $T_x$ (resistance 40 of FIG. 7) in the case of a motor having saturable zones (FIG. 2). In this case, the controlling of the switches as shown in FIG. 7 is effected in accordance with the following table:

| Period | Switches | | | | |
|---|---|---|---|---|---|
| | 31 | 32 | 33 | 34 | 35 |
| $T_t$ = { $T_{RB}$ } = $T_n$ | closed | closed | open | open | closed |
| $T_x$ } = $T_n$ | closed | closed | open | open | open |
| $T_c$ | closed | closed | open | open | closed |
| $T_{cc}$ | closed | open | closed | open | closed |

Figure 1:
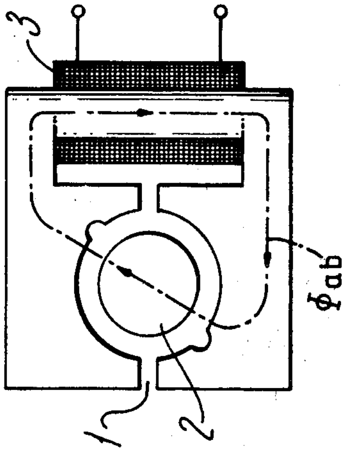
FIG. 1 is a schematic representation of a known motor of which the poles of the stator are separated by air gaps.

It should be mentioned that the method employing the gap or window is perfectly applicable to a motor having air gaps (see FIG. 1) where the phenomenon of extinction of the induced voltage likewise exists when the control pulse is prolonged. In this case, it appears unnecessary to change the lay-out of FIG. 7 and the control sequence of the table above if a common type of electronic control circuit is desirable for both types of motor. However, one may also arrange that the winding of the motor be open-circuited, as is recommended in the application EP 0 022 270, when one wishes to measure the induced voltage. Should such be the case, the resistance 40 will be eliminated and the switch 35 represented in FIG. 7 and the switches 31 to 34 will be opened during the measurement gap having a duration of $T_x$. Again it should be said that if the induced voltage in open circuit is measured in the air gap type motor, the graph of FIG. 11 will remain the same except in respect of the current i which is annulled during period $T_x$.

FIG. 12 shows in an example how the width of the control pulse is adapted to the load placed on the motor and at what moment the induced voltage is measured. For the construction given hereinabove as example, it has been established that the induced voltage is still sufficient if one measures during a period $T_x=1$ ms immediately preceding the end of the control pulse of which the duration is equal or less than $T_n=5$ ms. From the level 1 where the load is the smallest to level 3 where it is slightly higher, the duration of the control pulse goes from 4 to 5 ms. The measurement of the induced voltage is made immediately before the end of the control pulse since the duration of said pulse is equal (level 3) or less than (levels 1 and 2) the duration $T_n$. It will be seen that for the same levels, the duration $T_{RB}$ of the motor pulse $U_B$ goes from 3 to 4 ms. From level 4 on, adapted to a heavier load, and up to level 6 corresponding to the maximum load which may be imposed by all of the load demands brought together at the same time, the duration of the control pulse goes from 6.5 to 10 ms. The measurement of the induced voltage must be performed in a window or gap $T_x$ for, from level 4 on, the width of the control pulse is greater than the predetermined duration $T_n$. In the three last levels, the window separates the two motor pulses $U_B$ and $U_c$ of which the first is of constant duration $T_{RB}=4$ ms and the second $T_c$ is of 1.5, 3 and 5 ms respectively when one passes from level 4 to level 6. FIG. 12 also shows the recovery pulse of duration $T_a$ for which the width has been chosen to be 8 ms.

The invention which has just been described has the same purpose as that which has been set forth in patent application EP 0 022 270, to wit, to propose a method capable of detecting an induced voltage signal of great amplitude when the motor winding receives a pulse having the correct polarity. This method leads to a very reliable functioning of the slaving system which responds by yes or no as is the case in a binary logic system.

Furthermore, as has been set forth in respect of the cited patent application, the voltage Ui is compared to a reference voltage in a comparator. If Ui is greater than said reference, it shows that a correct polarity pulse has been applied to the motor and no signal will appear at the output of the comparator. The control circuit continues to apply pulses of the same duration. If, to the contrary, Ui is smaller than the reference, it can be concluded that a pulse of incorrect polarity has been applied to the motor and there will appear a signal at the output of the comparator which forces the control circuit to apply two recovery pulses followed by a pulse train of control pulses as has been explained hereinabove.

What we claim is:

1. A method for slaving a steping motor driven by a bipolar pulse train to the load imposed by a timepiece mechanism by supplying to said motor control pulses of at least three different increasingly longer durations, said method comprising the steps of:

measuring at the motor winding terminals the induced voltage Ui generated by rotation of the rotor responsive to a control pulse n of duration $T_1$;

comparing said induced voltage to a predetermined threshold;

whenever said induced voltage is less than said threshold applying two recovery pulses of substantially greater width and duration $T_a$ following said control pulse n;

thereafter driving the motor from pulse n+1 on by pulses of greater duration $T_2$;

measuring the induced voltage Ui generated by rotation of the rotor responsive to a control pulse n+2 and comparing said induced voltage to said threshold;

whenever said induced voltage is less than said threshold applying two recovery pulses of duration $T_a$ following said control pulse n+2;

thereafter driving the motor from pulse n+3 on by pulses of further increased duration $T_3$;

continuing the method in the same manner with the leading flank of the control pulses n, n+1, n+2, n+3, etc., being separated by a constant time interval and the pulse durations established so that $T_1<T_2<T_3<$etc.

2. The method as set forth in claim 1 including the step of counting the number of recovery pulses applied within a predetermined time interval, and, following application of the two recovery pulses continuing to drive the motor by control pulses of the same duration as those applied just before the recovery pulses until the count reaches a predetermined value within said time interval.

3. The method as set forth in claim 1 including the step of applying a security pulse of duration $T_s$ to the motor winding at a predetermined time interval after the end of a control pulse thereby to bring the rotor if stalled in a position of unstable equilibrium to one or the other immediately neighbouring positions of stable equilibrium.

4. The method as set forth in claim 3 wherein the polarity of said security pulse is the inverse of the polarity of the preceding control pulse.

5. The method as set forth in claim 1 including the further steps of comparing the duration of the control pulses to a predetermined interval $T_n$;

placing a resistance in series with the motor winding whenever the aforesaid duration is equal to or less than said predetermined interval $T_n$ during a period $T_x$ situated immediately before the end of a control pulse;

measuring the induced voltage Ui at the motor winding terminals over a predetermined interval $T_{Ui}$ within the period $T_x$.

6. The method as set forth in claim 5 wherein the duration of the control pulses is greater than said predetermined interval $T_n$.

7. The method as set forth in claim 1 wherein the duration of the control pulses is adjusted to the motor load by successively increased levels when the load increases and by successively decreased levels when the load decreases.

8. The method as set forth in claim 7 wherein the presence of the induced voltage Ui greater than the predetermined threshold over a predetermined time interval indicative of uninterrupted stepping of the rotor effects decreasing of one level of duration of said control pulses, the process continuing in the same manner thereafter.

9. Driving arrangement for a stepping motor driven by a bipolar pulse train and slaved to a load imposed by a timepiece mechanism comprising a resistance coupled in series with the motor winding, said resistance being shunted by switch means and means operable to open said switch means whenever an induced voltage Ui is to be measured at the winding terminals.

* * * * *